(12) United States Patent
Jordan

(10) Patent No.: US 8,275,080 B2
(45) Date of Patent: Sep. 25, 2012

(54) SELF-SUPPORTING SIMPLEX PACKETS

(75) Inventor: Luis G. Jordan, Charles Town, WV (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 968 days.

(21) Appl. No.: 11/936,784

(22) Filed: Nov. 7, 2007

(65) Prior Publication Data
US 2008/0117952 A1    May 22, 2008

Related U.S. Application Data

(60) Provisional application No. 60/859,833, filed on Nov. 17, 2006.

(51) Int. Cl.
*H04L 7/00* (2006.01)
(52) U.S. Cl. ...................................... 375/354
(58) Field of Classification Search ............... 375/130, 375/131, 133, 134, 135, 136, 137, 140, 141, 375/145, 146, 147, 149, 354, 357, 369, 372, 375/373, 374; 370/395.62, 507; 455/265; 702/89; 713/375, 400
See application file for complete search history.

(56) References Cited

U.S. PATENT DOCUMENTS

| | | |
|---|---|---|
| 4,486,739 A | 12/1984 | Franaszek et al. |
| 4,649,396 A | 3/1987 | Friedman |
| 4,876,737 A | 10/1989 | Woodworth et al. |
| 4,901,307 A | 2/1990 | Gilhousen et al. |
| 5,109,390 A | 4/1992 | Gilhousen et al. |
| 5,309,474 A | 5/1994 | Gilhousen et al. |
| 5,376,778 A | 12/1994 | Kreft |
| 5,490,165 A | 2/1996 | Blakeney, II et al. |
| 5,537,397 A | 7/1996 | Abramson |
| 5,559,790 A | 9/1996 | Yano et al. |
| 5,566,168 A | 10/1996 | Dent |
| 5,568,472 A | 10/1996 | Umeda et al. |
| 5,625,629 A | 4/1997 | Wenk |
| 5,640,166 A | 6/1997 | Siwiak |
| 5,668,556 A | 9/1997 | Rouffet et al. |
| 5,697,050 A | 12/1997 | Wiedeman |
| 5,724,384 A | 3/1998 | Kim et al. |

(Continued)

FOREIGN PATENT DOCUMENTS

DE    102004016548 A1    10/2005

(Continued)

OTHER PUBLICATIONS

U.S. Appl. No. 11/681,759, Stafford et al., filed Mar. 3, 2007.

(Continued)

*Primary Examiner* — Sam K Ahn
*Assistant Examiner* — Leila Malek
(74) *Attorney, Agent, or Firm* — Morgan, Lewis & Bockius LLP

(57) ABSTRACT

Existing message fields and/or message parameters are configured to facilitate the packet and message synchronization and decoding tasks that conventionally rely upon a known bit sequence in each packet, thereby eliminating the need for a predefined message preamble in each packet. In example embodiments, the unique identifier of each transmitter is structured to facilitate determination of bit polarity and the start of each packet; packet sequence numbers use an unconventional counting sequence to assure synchronizing bit transitions; and so on. Other techniques, such as the use of run-length limited (RLL) message encoding, or 8b/10b encoding, to assure within-packet bit transitions, are also used to enhance clock synchronization and proper header location determination.

8 Claims, 2 Drawing Sheets

U.S. PATENT DOCUMENTS

| | | | |
|---|---|---|---|
| 5,758,260 A | 5/1998 | Wiedeman | |
| 5,790,070 A | 8/1998 | Natarajan et al. | |
| 5,796,777 A | 8/1998 | Terlep et al. | |
| 5,815,071 A | 9/1998 | Doyle | |
| 5,835,069 A | 11/1998 | Skoog | |
| 5,872,777 A | 2/1999 | Brailean et al. | |
| 5,920,278 A | 7/1999 | Tyler et al. | |
| 5,983,111 A | 11/1999 | Kim | |
| 6,052,561 A | 4/2000 | Rudowicz et al. | |
| 6,088,413 A | 7/2000 | Autry et al. | |
| 6,100,806 A | 8/2000 | Gaukel | |
| 6,121,922 A | 9/2000 | Mohan | |
| 6,128,469 A | 10/2000 | Zenick, Jr. et al. | |
| 6,151,313 A | 11/2000 | Abramson | |
| 6,163,681 A | 12/2000 | Wright et al. | |
| 6,185,245 B1 | 2/2001 | Kim | |
| 6,188,682 B1 | 2/2001 | Takagi et al. | |
| 6,205,167 B1 | 3/2001 | Kamgar et al. | |
| 6,307,840 B1 | 10/2001 | Wheatley, III et al. | |
| 6,317,029 B1 | 11/2001 | Fleeter | |
| 6,339,611 B1 | 1/2002 | Antonio et al. | |
| 6,349,110 B1* | 2/2002 | Davidovici et al. | 375/152 |
| 6,353,730 B1 | 3/2002 | Buettner et al. | |
| D455,641 S | 4/2002 | Trifilio | |
| 6,373,831 B1 | 4/2002 | Secord et al. | |
| 6,396,819 B1 | 5/2002 | Fleeter et al. | |
| 6,421,373 B1 | 7/2002 | Saito | |
| 6,510,172 B1 | 1/2003 | Miller | |
| 6,549,559 B2 | 4/2003 | Kamgar et al. | |
| 6,574,205 B1 | 6/2003 | Sato | |
| 6,628,699 B2 | 9/2003 | Ramberg et al. | |
| 6,639,906 B1 | 10/2003 | Levin | |
| 6,683,605 B1 | 1/2004 | Bi et al. | |
| 6,720,801 B2 | 4/2004 | Houlberg | |
| 6,728,298 B1 | 4/2004 | Okubo et al. | |
| 6,754,190 B2 | 6/2004 | Gurney et al. | |
| 6,763,056 B1 | 7/2004 | Ohsuge | |
| 6,768,729 B1 | 7/2004 | Ohsuge | |
| 6,799,094 B1 | 9/2004 | Vaida et al. | |
| 6,876,645 B1 | 4/2005 | Guey et al. | |
| 6,894,995 B2 | 5/2005 | Chitrapu et al. | |
| 6,944,149 B1 | 9/2005 | Kim et al. | |
| 6,985,512 B1* | 1/2006 | McDermott et al. | 375/147 |
| 7,006,032 B2 | 2/2006 | King et al. | |
| 7,053,767 B2 | 5/2006 | Petite et al. | |
| 7,110,435 B1 | 9/2006 | Sorrells et al. | |
| 7,131,136 B2 | 10/2006 | Monroe | |
| 7,203,630 B2 | 4/2007 | Kolb et al. | |
| 7,236,778 B2 | 6/2007 | Schreiber | |
| D554,474 S | 11/2007 | Miller | |
| D574,221 S | 8/2008 | Allen | |
| D582,918 S | 12/2008 | Scott | |
| 7,592,953 B2 | 9/2009 | Morana | |
| 2002/0024965 A1 | 2/2002 | Lee | |
| 2002/0089434 A1 | 7/2002 | Ghazarian | |
| 2002/0097690 A1 | 7/2002 | Fleeter et al. | |
| 2002/0173888 A1 | 11/2002 | Shelton et al. | |
| 2002/0177476 A1 | 11/2002 | Chou | |
| 2002/0191632 A1 | 12/2002 | McDermott | |
| 2003/0161428 A1 | 8/2003 | Garrett et al. | |
| 2003/0202485 A1 | 10/2003 | Mansfield | |
| 2004/0008253 A1 | 1/2004 | Monroe | |
| 2004/0029579 A1 | 2/2004 | Kashiwase | |
| 2004/0029615 A1 | 2/2004 | Gerry et al. | |
| 2004/0117611 A1 | 6/2004 | Huber et al. | |
| 2004/0121729 A1 | 6/2004 | Herndon et al. | |
| 2004/0183673 A1 | 9/2004 | Nageli | |
| 2004/0246104 A1 | 12/2004 | Baechtiger et al. | |
| 2005/0038601 A1 | 2/2005 | Dentinger et al. | |
| 2005/0041573 A1 | 2/2005 | Eom et al. | |
| 2005/0060339 A1 | 3/2005 | McGee | |
| 2005/0076034 A1 | 4/2005 | Addonisio et al. | |
| 2005/0143005 A1 | 6/2005 | Moore, III | |
| 2005/0175123 A1 | 8/2005 | Gurney et al. | |
| 2005/0176436 A1 | 8/2005 | Mantravadi et al. | |
| 2005/0201311 A1 | 9/2005 | Willey et al. | |
| 2005/0248456 A1 | 11/2005 | Britton, Jr. et al. | |
| 2005/0281319 A1* | 12/2005 | Schilling | 375/135 |
| 2006/0055561 A1 | 3/2006 | Kamali et al. | |
| 2006/0094450 A1 | 5/2006 | Park et al. | |
| 2006/0140314 A1 | 6/2006 | Kim et al. | |
| 2006/0141930 A1 | 6/2006 | Keen et al. | |
| 2006/0187026 A1 | 8/2006 | Kochis | |
| 2006/0251107 A1* | 11/2006 | Geren et al. | 370/462 |
| 2007/0031150 A1 | 2/2007 | Fisher et al. | |
| 2007/0040647 A1 | 2/2007 | Saenz et al. | |
| 2007/0116158 A1 | 5/2007 | Guo et al. | |
| 2007/0117515 A1 | 5/2007 | Sinibaldi et al. | |
| 2007/0130599 A1 | 6/2007 | Monroe | |
| 2007/0291826 A1 | 12/2007 | Hafuka | |
| 2007/0293149 A1 | 12/2007 | Wubker | |
| 2007/0298786 A1 | 12/2007 | Meyers et al. | |
| 2008/0030345 A1 | 2/2008 | Austin et al. | |
| 2009/0135954 A1 | 5/2009 | Salhov et al. | |
| 2009/0175299 A1 | 7/2009 | Hosokawa et al. | |

FOREIGN PATENT DOCUMENTS

EP            1406207 A1        4/2004

OTHER PUBLICATIONS

U.S. Appl. No. 11/876,747, McDermott et al., filed Oct. 22, 2007.
Berthet, Synchronization Complexity for a Satellite Multimedia Burst Receiver, [date], 5 pgs.
Candell, Office Action, U.S. Appl. No. 12/692,789, Mar. 30, 2012, 8 pgs.
Evans, Satellite Communication Systems 3rd edition, Jan. 2009, cover page and p. 468.
Fleeter, Notice of Allowance and Fees Due, U.S. Appl. No. 10/054,175, Aug. 18, 2004, 7 pgs.
Fleeter, Office Action, U.S. Appl. No. 09/130,854, Nov. 22, 2000, 7 pgs.
Fleeter, Office Action, U.S. Appl. No. 10/992,173, Apr. 8, 2011, 14 pgs.
Fleeter, Final Office Action, U.S. Appl. No. 10/992,173, Oct. 12, 2011, 15 pgs.
Franke, Choosing the best hardware form-factor for the airborne domain of the Joint Tactical Terminal (JTT) and Joint Tactical Radio System (JTRS), Aug. 6, 2002, 8 pgs.
Handermann, Notice of Allowance and Fees Due, U.S. Appl. No. 11/685,936, Dec. 1, 2009, 6 pgs.
Handermann, Office Action, U.S. Appl. No. 11/685,936, Sep. 9, 2009, 22 pgs.
Handermann, Office Action, U.S. Appl. No. 11/685,936, Oct. 20, 2008, 16 pgs.
Handermann, Supplemental Notice of Allowability, U.S. Appl. No. 11/685,936, Dec. 15, 2009, 4 pgs.
Harms, The Orbcomm Experience, EMPS 2004, Sep. 2004, 6 pgs.
Holm, Why convert to a SAASM-based Global Positioning System?, Military Embedded Systems, Oct. 2005, 3 pgs.
International Search Report and Written Opinion, PCT/US2006/042524, Apr. 22, 2008, 13 pgs.
International Search Report and Written Opinion, PCT/US2006/049656, Feb. 21, 2008, 12 pgs.
International Search Report and Written Opinion, PCT/US2007/063986, Oct. 26, 2007, 12 pgs.
Larson, Space Mission Analysis and Design, 2nd Edition, Ch. 22, Design of Low-Cost Spacecraft, Space Technology Library, 1993, 32 pgs.
McDermott, Notice of Allowance and Fees Due, U.S. Appl. No. 11/739,377, Dec. 14, 2011, 7 pgs.
McDermott, Notice of Allowance and Fees Due, U.S. Appl. No. 09/513,962, Sep. 9, 2005, 4 pgs.
McDermott, Notice of Allowance and Fees Due, U.S. Appl. No. 10/208,882, Apr. 10, 2007, 8 pgs.
McDermott, Notice of Allowance and Fees Due, U.S. Appl. No. 11/876,747, Jun. 3, 2009, 7 pgs.
McDermott, Office Action, U.S. Appl. No. 09/513,962, Sep. 14, 2004, 6 pgs.
McDermott, Final Office Action, U.S. Appl. No. 09/513,962, Apr. 16, 2004, 10 pgs.
McDermott, Office Action, U.S. Appl. No. 09/513,962, Jun. 24, 2003, 10 pgs.

McDermott, Final Office Action, U.S. Appl. No. 09/513,962, May 27, 2005, 9 pgs.
McDermott, Office Action, U.S. Appl. No. 11/739,377, Aug. 23, 2011, 17 pgs.
McDermott, Office Action, U.S. Appl. No. 11/876,747, Nov. 28, 2008, 5 pgs.
McDermott, Office Action, U.S. Appl. No. 10/208,882, Jan. 3, 2007, 11 pgs.
Meyers, Notice of Allowance and Fees Due, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance and Fees Due, U.S. Appl. No. 11/618,379, May 13, 2009, 4 pgs.
Morana, Office Action, U.S. Appl. No. 11/618,379, Jan. 6, 2009, 7 pgs.
Morana, Office Action, U.S. Appl. No. 12/585,056, Oct. 13, 2011, 8 pgs.
Morana, Office Action, U.S. Appl. No. 29/270,057, Feb. 26, 2009, 5 pgs.
Ormesher, Current Radar Responsive Tag Development Activities at Sandia National Laboratories, Proc. of SPIE vol. 5410, 2004, 7 pgs.
Skiscim, Notice of Allowance and Fees Due, U.S. Appl. No. 12/101,391, Jul. 22, 2011, 18 pgs.
Skiscim, Office Action, U.S. Appl. No. 12/101,391, Jan. 4, 2011, 14 pgs.
Smith, Office Action, U.S. Appl. No. 12/396,447, Dec. 5, 2011, 31 pgs.
Stafford, Notice of Allowance and Fees Due, U.S. Appl. No. 11/681,759, Aug. 13, 2008, 7 pgs.
Stafford, Notice of Allowance and Fees Due, U.S. Appl. No. 11/937,826, Jul. 29, 2011, 8 pgs.
Stafford, Final Office Action, U.S. Appl. No. 11/681,759, May 20, 2008, 8 pgs.
Stafford, Office Action, U.S. Appl. No. 11/681,759, Dec. 21, 2007, 7 pgs.
Stafford, Office Action, U.S. Appl. No. 11/937,826, Sep. 16, 2010, 5 pgs.
Summers, Plug and play testbed to enable responsive space missions, IEEE paper #1221, Mar. 5-12, 2005, 8 pgs.
Zenick Jr., Notice of Allowance and Issue Fee Due, U.S. Appl. No. 09/045,970, Sep. 24, 2001, 2 pgs.
Zenick Jr., Office Action, U.S. Appl. No. 09/045,970, Apr. 10, 2001, 4 pgs.
Zenick Jr., Office Action, U.S. Appl. No. 09/045,970, Oct. 25, 2001, 3 pgs.

* cited by examiner

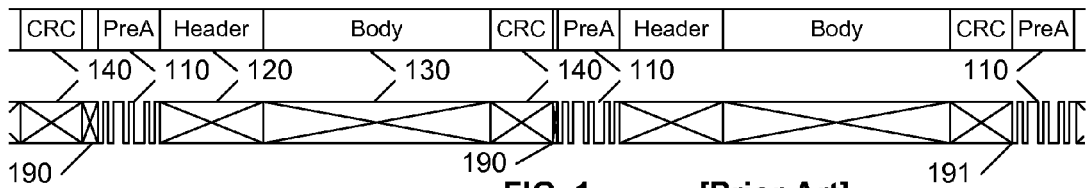
FIG. 1 [Prior Art]
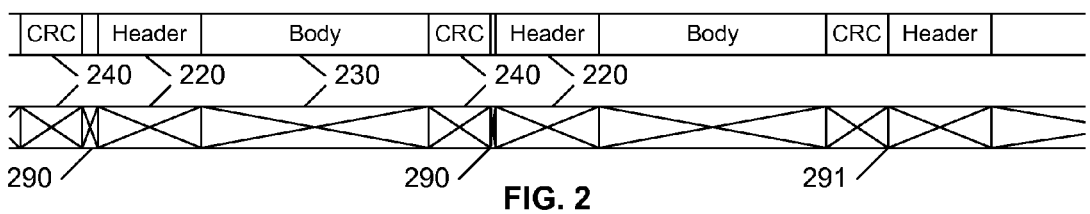
FIG. 2
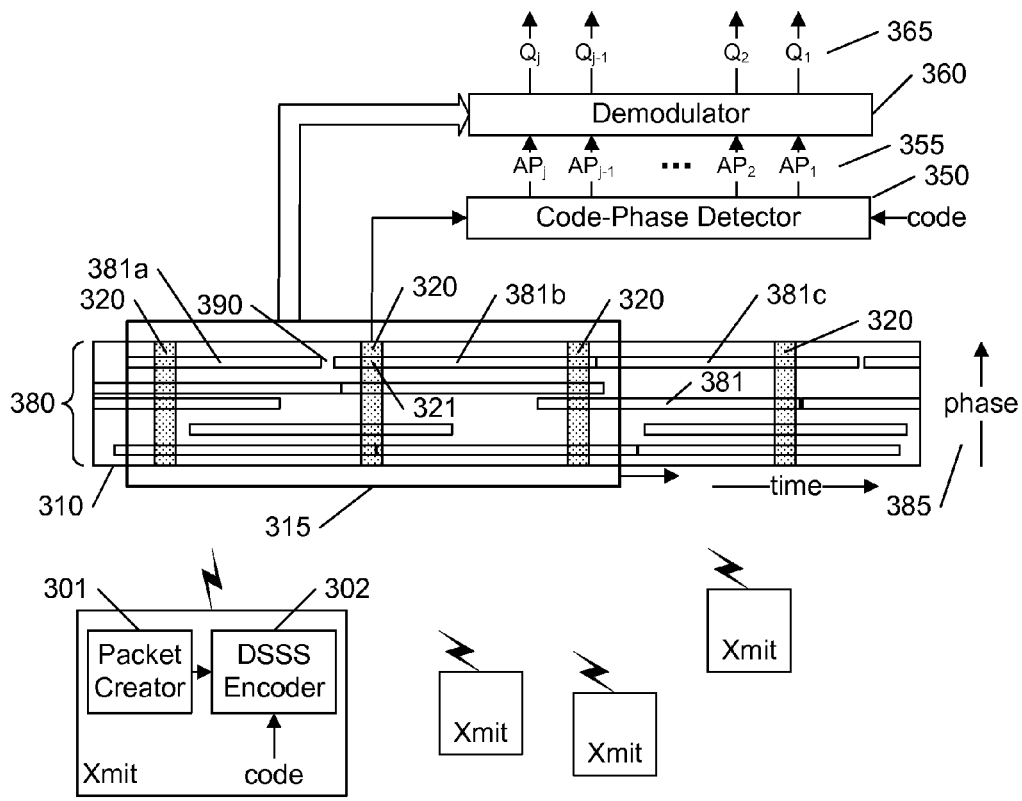
FIG. 3

SELF-SUPPORTING SIMPLEX PACKETS

This application claims the benefit of U.S. Provisional Patent Application 60/859,833, filed 17 Nov. 2006.

BACKGROUND AND SUMMARY OF THE INVENTION

This invention relates to the field of communication systems, and in particular to packets that are transmitted using a spread-spectrum code.

Spread-Spectrum techniques are used to modulate an information signal such that the modulated signal appears as noise. The information is modulated by a pseudo-random sequence of bits, and can be demodulated, or despread, by the same pseudo-random sequence. This modulation is commonly referred to as Direct-Sequence Spread Spectrum (DSSS). The modulated signal is spread across a bandwidth that is substantially larger than the bandwidth of the information signal, and has the apparent effect of increasing the noise-floor of receivers that receive this signal. Applying the same pseudo-random sequence to the modulated signal allows the information signal to be detected within this apparent noise.

A significant characteristic of a proper pseudo-random spread spectrum code is that a coherent output is produced only when the decoding code sequence is applied substantially in phase with the encoding code sequence. If the received signal is decoded with a code-phase that is out of phase with the transmitter, and the code is a proper pseudo-noise code having defined uniqueness characteristics, such as a maximum length shift register sequence, then the decoding of this out-of-phase signal produces a noise output. U.S. Pat. No. 5,537,397, "SPREAD ALOHA CDMA DATA COMMUNICATIONS", issued Jul. 16, 1996, to Norman Abramson, and incorporated by reference herein, discloses a technique that uses this phase-dependency characteristic to allow multiple transmitters to use the same code concurrently. Each active transmitter is assigned a particular code-phase by the receiving and/or controlling node, and the timing of the transmitter is controlled (advanced/retarded) by the receiver to assure that each transmitter's signal is received at a code phase that is distinguishable from other transmitters.

Because each transmission from the multiple transmitters appears as noise to the receiving system, and because the transmitted signal is dependent upon the spreading code, the code-phase, and the value of the information bit being transmitted, the determination of any one of these three parameters generally depends upon knowledge of the other two parameters. Therefore, in a conventional spread-spectrum system that uses a known spreading code, a sequence of known information bits, commonly termed a message 'preamble', is transmitted to allow a receiver to determine the code phase of the transmission. Subsequent transmissions of information bits that are unknown to the receiver (i.e. new information from the transmitter) can then be decoded at the receiver, based on knowledge of the spreading code and this determined code phase of the transmitter.

The 'cost' or 'overhead' associated with transmitting a sequence of known information bits with each message or packet of actual information is dependent upon the relative sizes of the known information sequence and the actual information sequence. Typically, the known information sequence required for code-phase detection is in the order of tens of bits; if the actual information sequence is in the order of thousands of bits, the overhead cost of transmitting the preamble is fairly insignificant. If, on the other hand, the actual information sequence is in the order of a hundred bits, a relatively significant amount of transmission resources are consumed in sending the preamble. This overhead cost is of particular significance for mobile transmitters, as each transmission consumes battery power in proportion to the length of the transmission.

In conventional spread spectrum systems, the preamble to the message serves multiple purposes. In addition to facilitating the determination of the transmitter's code phase relative to the receiver, the preamble is typically also used to identify bit polarity, locate start and stop bits, align data packets, and so on. Because a preamble of known information bits is required for conventional spread spectrum code-phase determination, there is generally little or no additional cost or overhead associated with structuring such a preamble to efficiently perform these additional packet-synchronizing and message-decoding tasks.

Copending U.S. patent applications, Ser. No. 11/681,759, "DETECTION OF MULTIPLE-CODE-PHASE TRANSMISSIONS", filed 3 Mar. 2007 for James F. Stafford, Scott A. McDermott, and William F. Seng, and Ser. No. 11/876,747 "COHERENT DETECTION WITHOUT TRANSMISSION PREAMBLE", filed 22 Oct. 2007 for Scott A. McDermott, James F. Stafford, and Luis G. Jordan, each incorporated by reference herein, disclose techniques that facilitate determination of a transmitter's code phase relative to a receiver without requiring a known information bit sequence. Other techniques, such as disclosed in U.S. Pat. No. 6,985,512, "ASYNCHRONOUS SPREAD-SPECTRUM COMMUNICATIONS", issued 10 Jan. 2006 to Scott A. McDermott and Leif Eric Aamot, and its CIP, U.S. patent application Ser. No. 10/208,882, "SPREAD-SPECTRUM RECEIVER WITH PROGRESSIVE FOURIER TRANSFORM", filed 31 Jul. 2002 for Scott A. McDermott, each also incorporated by reference herein, also allow for transmitter code-phase detection without requiring a known information bit sequence.

The elimination of the need for a known information bit sequence to determine a spread-spectrum transmitter's code phase, however, does not eliminate the need for a transmission preamble, per se. The aforementioned packet and message synchronization and decoding tasks that are generally placed on the message preamble are still required, even though the code-phase detection task may have been eliminated.

It would be advantageous to eliminate the need for a preamble of known bits in a spread-spectrum communication system. It would also be advantageous to provide a defined structure or message architecture that allows for efficient packet and message synchronization and/or decoding without reliance upon a preamble of known bits.

These advantages, and others, can be realized by using existing message fields and/or message parameters to perform the packet and message synchronization and decoding tasks that are conventionally performed by message preambles that use a known bit sequence, thereby eliminating the need for message preambles. In example embodiments, the unique identifier of each transmitter is structured to facilitate determination of bit polarity and the start of each packet; packet sequence numbers use an unconventional counting sequence to assure synchronizing bit transitions; and so on. Other techniques, such as the use of run-length limited (RLL) message encoding to assure within-packet bit transitions, are also used to enhance clock synchronization.

BRIEF DESCRIPTION OF THE DRAWINGS

The invention is explained in further detail, and by way of example, with reference to the accompanying drawings wherein:

FIG. 1 illustrates an example sequence of packets, each with a preamble of predefined bits.

FIG. 2 illustrates an example sequence of packets without sequences of predefined bits.

FIG. 3 illustrates an example block diagram for processing spread-spectrum packets that do not include sequences of predefined bits.

DETAILED DESCRIPTION

Figure 4:
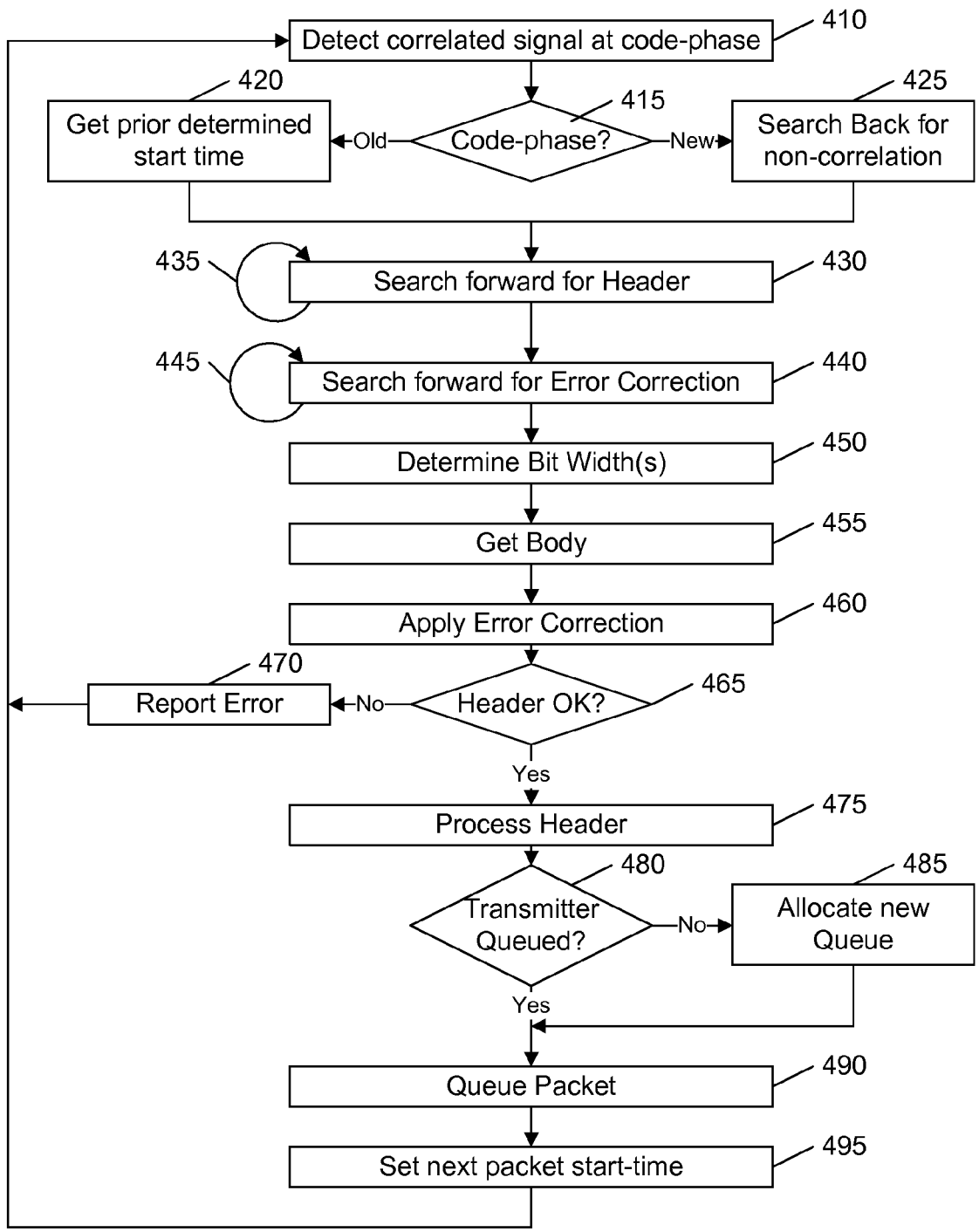
FIG. 4 illustrates an example flow diagram for processing spread-spectrum packets that do not include sequences of predefined bits Throughout the drawings, the same reference numerals indicate similar or corresponding features or functions. The drawings are included for illustrative purposes and are not intended to limit the scope of the invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Similarly, the invention is illustrated using a conventional packet structure that includes a header at the start of the packet and error correcting code at the end of the packet, for ease of understanding. One of skill in the art will recognize in view of this disclosure that the principles presented herein are independent of any particular ordering or content of elements within a packet, and regardless of the time-ordering of the terms 'beginning' and 'end', or 'start' and 'end' of a packet. In like manner, the term packet is used herein in its broadest sense to mean a sequence of data that is identifiable and/or distinguishable from another sequence of data.

FIG. 1 illustrates an example conventional data stream with a preamble of predefined bits at the start of each transmitted packet. In this example, each packet includes a preamble 110, a header 120, a body 130, and error correction code 140, such as a cyclic redundancy check (CRC). Between each packet, there may or may not be a period of non-transmission 190 of unknown duration; reference item 191 illustrates a continuous transmission of packets with no break between the end of one packet and the preamble 110 of the next packet.

As noted above, the conventional spread-spectrum encoded packet includes the preamble of known bit values 110 in order to allow the receiver to determine the code-phase of the transmitted packet, based on which, the unknown bits of the header 120, body 130, and error correction code 140 can be determined (de-spread). However, as illustrated in FIG. 1, the presence of a repetitive known sequence of bits allows a receiver of the data stream to distinguish the start of each packet, and based on this start, determine the sequences of bits corresponding to the header 120, the body 130, and the error correction code 140. Absent a determination of the start of each packet, it is virtually impossible to distinguish which bits correspond to which segments of the received stream of packets.

As also noted above, advancements in the art of spread spectrum communications allow for the determination of the code-phase of the transmitted signal relative to the receiver without requiring a sequence of known bit values, thereby providing an opportunity to reduce the overhead cost associated with the transmission of such a known sequence.

FIG. 2 illustrates an example data stream that does not include a preamble of known bit values. The header 220, body 230, and error correction code 240 are similar in content to the conventional header 120, body 130, and error correction code 140, but with one or more enhancements, discussed below, to facilitate the determination of the start of each packet and, correspondingly, the distinguishing of each segment of the packet. It is significant to point out that although FIG. 2 illustrates the segmentation of each packet into a header 220, body 230, and error correction code 240, such segmentation is not apparent at the receiver until the proper start of each packet is determined. That is, for example, absent a determination of the start of the packet, the bits corresponding to the body 230 of the packet are indistinguishable from the bits corresponding to the header 220 or the error correction code 240. As in the conventional transmissions of FIG. 1, the sequence of transmitted packets in FIG. 2 may include gaps 290 of varying duration, including zero-duration gaps 291.

It is to be noted that although the header of a packet is typically located at the start of each packet, one of skill in the art will recognize that the accurate determination of the location of any part of a packet of a given structure will enable a determination of the start time of the packet. As used herein, the term 'header' is interpreted to mean a field of a packet other than the portion of the message that contains application-dependent data, typically termed the body of the message. In like manner, the term error correction code is used in the general sense to mean a field of a packet other than the body of the message that is dependent upon the content of the body of the message and serves to identify an occurrence of an error, and preferably includes information that facilitates correction of the error at the receiver; if the code only identifies an occurrence of an error, the 'correction' is typically performed by requesting a retransmission.

It is also to be noted that, as used herein, the term 'time' is used in a relative, rather than absolute sense, and in reality the 'start time' of a packet may be represented merely by a particular memory location in a buffer that contains the packet, and the time ordering of the data is immaterial. That is, for example, in a system that may include first-in, last-out storage buffers, the 'beginning' of a packet may correspond to a byte that was transmitted and/or received latest in time. The terms 'start' and 'end' are used for ease of reference herein, and merely identify opposite extents of a packet.

Although the potential breaks 290 provide evidence of the start of each packet, the specific start and end of each break 290 is generally ambiguous in a spread spectrum receiving system. Generally, the de-spreading of a received signal is based on a determined correlation between the received signal and the spreading code at the determined code phase. The correlation varies between a given minimum and maximum value. The determination of the transmitted bit value is based on how close the determined correlation is to the minimum or maximum. If the determined correlation is close to the maximum, the bit valued is determined to be a first binary value (e.g. logic 1); if the determined correlation is close to the minimum, the bit value is determined to be the other binary value (e.g. logic 0). If the determined correlation is not close to either the minimum or the maximum, the bit-value is determined to be unknown. This unknown value may be due to noise that corrupts the transmitted signal, or due to the absence/cessation of the transmitted signal. The definition of 'close' is a design parameter that is typically based on a tradeoff between the likelihood of mistakenly determining that a transmitted bit is present when it is not, versus the likelihood of mistakenly determining that a bit was not transmitted when it was.

The ambiguity associated with determining whether or not a bit was transmitted is further complicated by a lack of knowledge regarding where each bit begins and ends. If the correlation is determined based on samples that include a transition, the magnitude of the determined correlation will be diminished, increasing the likelihood of mistakenly determining an absence of a valid bit transmission. In a conventional packet transmission with a known preamble, the preamble generally includes a sufficient number of bit transitions to facilitate synchronization of the receiver clock to the received signal and thereby define the beginning and end of each bit relative to the synchronized clock.

In accordance with one aspect of this invention, the header 220 is configured to include a sequence of bit transitions that enables a receiver to determine a start of the packet. Any of a number of techniques can be used to effect this determination. Commonly, the header of a packet identifies the transmitter of the packet, using a transmitter identifier. In an example embodiment of this invention, the transmitter identifier is selected to have a given set of characteristics that facilitate determination of the start of each packet. These characteristics include, for example, assuring that a long sequence of zeros or ones is not used in the transmitter identifier. For example, if the transmitter identifier is six bits wide, and it is decided that the maximum 'run' of the same digit should not exceed three bits, the eight digits that contain four zeros in a row (000000, 000001, 000010, 000011, 010000, 100000, 100001, 110000) and the eight digits that contain four ones in a row are not assigned to any transmitter. Although this reduces the number of unique identifiers to 48, instead of the possible 64 provided by six bits, this reduction assures bit transitions within the identifier.

Other techniques for providing transmitter identifiers having favorable characteristics may be used, such as only assigning transmitter identifiers that include a given number of transitions, identifiers that exhibit high auto-correlation and/or low cross-correlation characteristics, and so on. Selecting transmitter identifiers having a given set of characteristics can facilitate the determination of the start of the header by verifying that the decoded transmitter identifier also exhibits these characteristics. For example, if a valid transmitter identifier includes at least "m" transitions, and, due to a mistaken determination of the start of the identifier, a decoded transmitter identifier has fewer than "m" transitions, one can conclude that either the identifier has been corrupted, or that the wrong set of bits have been identified as the transmitter identifier. If a shift of the assumed start time results in a decoded transmitter identifier having at least "m" transitions, one can conclude that this new assumed start time is more likely to be correct than the prior assumed start time. In like manner, if a valid transmitter identifier is one that exhibits high autocorrelation, and one assumed start time shows a high autocorrelation while another assumed start time shows a low or mediocre autocorrelation, the assumed start time that provides the high correlation is more likely to be the proper start time.

Determining the validity of the transmitter identifier, given an assumed start-time of the identifier and/or the packet, may be combined with other data validation techniques. For example, the transmitter identifier may include an error correction code, and the validity of the transmitter identifier using the above techniques may be applied after application of this self-correction.

Although the transmitter identifier is a field in the header that is particularly well suited for creating a header that facilitates a determination of the start of the packet and/or the synchronization of the receiver to the received packet, any of the other fields that are common in a header may be configured to facilitate these functions. For example, the header of a packet typically includes an identifier of a sequence number that identifies the order in which packets were originally formed at the transmitter for a given transmission session. These sequence numbers may use the aforementioned mapping of 48 sequence number values to select values of a six bit sequence that does not include a run in excess of three bits of the same value, thereby assuring at least one transition within the sequence number field to facilitate synchronization of the receiver to the received bits of the packet.

The transmitter identifier, or the entire header, may also be encoded using conventional techniques that avoid long runs of a logic value, such as a Run Length Limited (RLL) encoding, commonly used for magnetic media recordings, or 8b/10b encoding as used in IEEE 1394b, and other systems. The 8b/10b encoding technique is presented in U.S. Pat. No. 4,486,739, "BYTE ORIENTED DC BALANCED (0, 4) 8B/10B PARTITIONED BLOCK TRANSMISSION CODE", issued 4 Dec. 1984 to Peter A. Franaszek and Albert X. Widmer, incorporated by reference herein. In an 8b/10b encoding, 8-bit symbols are mapped to 10 bit symbols to achieve bounded disparity between the number of zeros and ones, with a maximum run length of five.

In addition to providing a sufficient number of transitions to facilitate clock synchronization, an encoding that maps 8 bits to a unique set of 10 bits also provides for a reliable determination of the location of a valid header. Because each of 256 ($2^8$) values is mapped to one of 1024 ($2^{10}$) values, the number of 'valid' ten bit numbers is limited to 256. That is, the odds of any sequence of ten bits corresponding to a valid 8b/10b encoded sequence is one in four. If the header includes 30 bits (an encoding of 24 original bits), the odds of an improper header being identified as a proper header is 1 in 64 (¼*¼*¼). That is, the likelihood of mis-identifying the location of the actual 30 bit header due to a misidentification of the start of the header is 1 in 64. If the header includes 40 bits, this likelihood is reduced to 1 in 256.

Other techniques for determining the correct start of the packet will be evident to one of skill in the art in view of this disclosure. For example, an error detecting code may be included in the header, and the start of the packet can be defined as the start time that results in a detection of no errors. If the start time is in error, the header bits, including the error detecting bits, will be shifted relative to their actual location within the header, and the likelihood of a shifted set of error detecting bits corresponding to the error detecting bits of a shifted set of other header bits will be in the order of one in $2^k$, where k is the number of error detecting bits.

An m-to-n mapping of bits, where n>m, may also be configured to allow the determination of bit polarity, if required. In some communication systems, the modulation and demodulation process allows for an undetectable reversal of phase between the original data signal and the demodulated data signal. Conventionally, the transmission of a known sequence of bits allows for the determination of which physical voltage value corresponds to which logical data value. In an m-to-n mapping system, if none of n-bit encodings of the valid $2^m$ symbols are compliments of each other, the proper mapping of logical data value to demodulated physical value can be determined by comparing the demodulated physical value to the corresponding valid logic sequence. For example, if a valid 6 bit symbol is 001011, and the received physical values are +V, +V, −V, +V, −V, −V, and it is known that the inverse 110100 is not a valid symbol, then +V must be equivalent to logic 0, and −1 must be equivalent to logic 1.

In general, if any field in the header is known to include one of a set of symbols, and no symbol in the set of symbols is a logical inversion of another symbol in the set, the proper polarity mapping can be determined. This rule can be further expanded/relaxed, based on the particular expected characteristics of the field. If the field, for example, corresponds to a sequence number, it can be assumed that the inverse of low ordered packet numbers (i.e. high packet numbers) will not appear in the originally appearing packets from a transmitter, and thus the proper polarity mapping can be determined. As such, the general rule for determining bit polarity may be expressed as: if any field in the header is known to include one of a set of symbols, and no symbol in the set of symbols is a logical inversion of another symbol in the set that is in temporal proximity to the symbol, the proper polarity mapping can be determined. Viewed in this manner, it is apparent that the determination of polarity for a particular packet may be dependent upon the polarity determined in prior transmissions from a given transmitter. For example, the sequence number of a prior packet from a transmitter may be used to determine the polarity of the sequence number of a subsequent packet from the same transmitter, as it is likely that the subsequent sequence number will be relatively close to the prior sequence number from that transmitter, and an inverse of such a sequence number will not be a likely occurrence.

Alternatively, polarity-independent coding schemes, such as NRZ-M and NRZ-S, wherein the occurrence or non-occurrence of a transition indicates a corresponding logic value, independent of the direction of the transition, may be used to avoid the need to determine polarity, per se. In such an embodiment, however, long strings of the same input logic value may result in an absence of transitions for determining or maintaining bit synchronization. In a preferred embodiment, modified forms of conventional NRZ (Non-return to zero) encoding schemes may be used to avoid long runs of a logic value, such as the modified NRZ-S scheme used by High-Level Data Link Control (HDLC) and Universal Serial Bus (USB) devices, wherein long periods without transitions are eliminated by using zero-bit insertion. HDLC transmitters insert a 0 bit after five contiguous 1 bits, and USB transmitters insert a 0 bit after six consecutive 1 bits. The receiver uses each transition to maintain clock synchronization, but otherwise ignores these non-data 0 bits.

FIG. 3 illustrates an example spread spectrum system that includes a plurality of transmitters and a receiver that allows for reception of transmitted packets that do not contain a sequence of bits that are known to the receiver a priori. In this example system, each transmitter includes a packet creator 301 and a spread-spectrum encoder 302, each spread spectrum encoder 302 being configured to encode packets from the packet creator 301 using the same spreading code, and the same nominal transmit frequency.

At the receiver, a buffer 315 is configured to store the received baseband signal 380 that includes coincident transmission of packets 381 from the transmitters at different code-phases 385. The buffer 315 forms a moving 'window' into the baseband signal 380 over time.

Samples 320 of the baseband signal are periodically sent to a code-phase detector 350 that is configured to identify active code-phases $AP_1$-$AP_j$ 355; an active code-phase being defined as a code-phase at which a strongly correlated signal is detected. As illustrated, the samples 320 do not necessarily occur at the start of each packet 381, and thus the phase-detector 330 cannot rely upon detecting a preamble of known bits within any given sample 320.

The demodulator 360 is configured to demodulate each packet 381 at each of the active code-phases AP and route the demodulated messages to an assigned queue Q 365. To effect the demodulation of each packet 381, the demodulator 360 traces back through the buffer 315 to determine the start of the packet 381 at the given active code-phase AP 355.

As illustrated in FIG. 3, the presence of the packet 381b will be determined based on the presence of samples 321 of the packet 381b in the samples 320. The demodulator 360 tracks back in time to identify the start of packet 381b in the buffer 315. In this example, the demodulator 360 will detect the gap 390 between the prior packet 381a at this code-phase and the current packet 381b as a loss of correlated signal at this code-phase. As noted above, a loss of correlation does not necessarily provide sufficient resolution to determine an accurate start of a packet. Therefore, the demodulator 360 is configured to search forward from the point of loss of correlation to detect the location of the header, or part of the header, based on characteristics associated with a proper header, as discussed above.

In an example embodiment, the demodulator 360 moves forward in the buffer 315 by half-bit lengths, or less, and tests the sequence at each resultant location for the particular characteristics. Ideally, the preferred characteristics of the sequence will exhibit a peak when the proper start position is found, and the searching ceases when the peak is detected. If a peak is not detectable, the first start location that provides a sequence that exhibits the desired characteristics is selected as the determined start of the packet.

Based on the determined start of the packet, the fields 220, 230, 240 of the packet 281 (FIG. 2) are subsequently demodulated, using, as necessary, the characteristics of the sequence in the determined header to facilitate demodulation. For example, due to Doppler and other effects, the actual received signal may exhibit a bit width that differs from the nominal bit width. If the transmitter ID is configured to contain a given number of transitions, these transitions can be used to determine the actual bit width of bits in the received signal.

The error correction field 240 may also, or alternatively, be configured to facilitate synchronization. In such an embodiment, if the error correction field is configured to also exhibit select characteristics, using, for example, the 8b/10b encoding detailed above, the demodulator 360 can 'skip ahead' to the location in the buffer 315 that should contain the error correction code 240, then search around this location to accurately locate the error correction code 240 based on these select characteristics, as detailed above for determining an accurate start of the packet. From this determination of the location of the error correcting code 240, and knowledge of the number of bits between the start of the packet and the error correcting code 240, a second estimate of the received bit width can be determined. Another estimate of the received bit width can be determined based on the transitions within the error correcting code 240. From these two or three additional bit width estimates, the demodulator 360 can determine a rate of change of the bit width during the length of the packet and correspondingly use this rate of change to more accurately define the bounds of each bit within the body 230. Additionally or alternatively, the body 230 of the packet may also be encoded so as to provide a sufficient number of bit transitions to maintain synchronization within the demodulator 360.

In a preferred embodiment, the determination of the end of the packet is also used to facilitate determination of the start of the next packet. If the end of the prior packet is within a packet length or so of the current sample period 320, this end location can be used as the starting point for the demodulator to initiate the forward search for the header, thereby avoiding having to search backward to find a gap 390 from which to initiate the forward search. This technique also facilitates locating the start of a packet 381c when there is no gap from the prior packet 381b.

FIG. 4 illustrates an example flow diagram for demodulating a packet in the absence of a preamble of known bits. The example components of FIG. 3 are referenced, although one of skill in the art will recognize that the process is applicable to other system configurations. In like manner, the conventional header-first packet structure is assumed for the purpose of illustration; one of skill in the art will recognize that the terms 'forward', 'back', 'beginning', 'end', and so on, are merely used herein to one direction or the other, or one extent or the other. Conventionally, headers are placed at the start of a packet to ease the task of distinguishing the header, but if the header is defined to occur at some other location in the packet, the terms search 'back' and 'forward' as used herein would be interpreted to correspond, for example, to search 'toward the header' and 'away from the header'; or, in the extreme, to search in both directions until the header is found.

At 410, the phase detector 350 notifies the demodulator 360 of a code-phase at which a correlated signal is detected. At 415, the demodulator 360 determines whether this is a newly active code-phase. If the code-phase was active at the prior sampling period 320, the end of the prior packet is used to initialize the forward search for the header, at 420; otherwise, the demodulator 360 searches back for a period of non-correlation, and uses the end of the non-correlation period to initialize the forward search, at 425. At 430, the demodulator searches forward for a header that exhibits the defined characteristics of a proper header, and loops 435 until one is found, thereby defining the start of the packet.

Optionally, at 440, the demodulator 360 skips forward and searches for a proper error correction code, and loops 445 until one is found, thereby defining the end of the packet. Based on the determined start and end of the packet, as well as the characteristics exhibited by the header field and the error correction code field, the bit width(s) of the received packet is/are determined, at 450, and these bit widths are used to distinguish the bits of the body of the packet for proper demodulation at 455. At 460, the demodulated error correction code is used to correct any errors in the packet, preferably including potential errors in the header. If, at 465, the error-corrected header is determined to be consistent with the initial criteria applied at 430 for identifying a proper header, the process continues; otherwise, an error is reported, at 470. Depending upon the particular system, the reporting of an error may result in an automatic request for retransmission, or the packet may merely be dropped.

At 475, the header is processed to determine, for example, the source and destination of the packet, the packet sequence number, and so on. If, at 480, this packet is identified as a continuation of a message from the same transmitter, the queue of the message is identified; otherwise, a new queue is allocated to this first packet, at 485. The packet, or select parts of the packet, are then routed to the allocated queue, at 490.

At 495, the determined end-time of the current packet is used to identify the earliest start-time of the next packet at this code-phase, and the process is repeated for each of the detected active code phases, via the loop 410-495. This processing of each of the detected active code-phases is repeated for each sample 320 of the receiver baseband signal 380.

As presented herein, the structuring of the bits in a header, or in parts of the header, facilitates an accurate determination of the start of each packet, without requiring a preamble of known bit values in each packet. In like manner, the structuring of the bits at the end of the packet, typically at the location of the error correction code, also facilitates an accurate determination of the end of each packet, and the determination of the earliest start of the next packet. The proper structuring of these bits, and/or bits in other parts of the packet also facilitates an accurate determination of the polarity of the received bits and facilitates the synchronization of the receiving demodulator to the received bits.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

I claim:

1. A method of decoding a packet that does not include a preamble of known bit values, comprising:
    at a device configured to decode the packet: despreading the packet using a spreading code,
    identifying a header of the packet that includes a sequence of bit transitions,
    identifying a body of the packet that includes information that has been transmitted by a transmitter, wherein identifying the header includes identifying a start of the packet based on the sequence of bit transitions,
    determining a first bit transition rate based on transitions in the header,
    identifying an end of packet sequence,
    determining a second bit transition rate based on transitions in the end of packet sequence, and
    estimating a bit transition rate for decoding bits in the body of the packet based on the first and second bit transition rates.

2. The method of claim 1, wherein the sequence of bit transitions identifies a transmitter of the packet.

3. The method of claim 1, wherein the end of packet sequence corresponds to an error correction code.

4. The method of claim 1, including determining a polarity of bits in the packet based on the sequence of bit transitions.

5. The method of claim 1, including synchronizing a demodulation of the packet based on the sequence of bit transitions.

6. A receiver comprising:
a receive buffer that is configured to receive a composite signal,
a phase detector that is configured to detect a code-phase of a message that does not include a sequence of known bit values,
a demodulator that is configured to:
  identify a header of the packet that includes a sequence of bit transitions,
  identify a start of the packet based on the sequence of bit transitions,
  identify a body of the packet that includes information that has been transmitted
by a transmitter,
  determine a first bit transition rate based on the bit transitions in the header,
  identify an end of packet sequence,
  determine a second bit transition rate based on transitions in the end of packet sequence, and
  determine a bit transition rate for decoding bits in the body of the packet based on the first and second bit transition rates.

7. The receiver of claim 6, wherein
the sequence of bit transitions identifies a transmitter of the packet.

8. The receiver of claim 6, wherein
the demodulator is configured to determine a polarity of bits in the packet based on the sequence of bit transitions.

* * * * *